(12) United States Patent
Anderson

(10) Patent No.: US 6,473,123 B1
(45) Date of Patent: *Oct. 29, 2002

(54) METHOD AND SYSTEM FOR ORGANIZING DMA TRANSFERS TO SUPPORT IMAGE ROTATION

(75) Inventor: Eric C. Anderson, San Jose, CA (US)

(73) Assignee: Flash Point Technology, Inc., Peterborough, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 78 days.

(21) Appl. No.: 08/916,186

(22) Filed: Aug. 21, 1997

(51) Int. Cl.[7] .............................. H04N 3/14; H04N 5/76
(52) U.S. Cl. ..................... 348/239; 348/230; 348/233; 348/280
(58) Field of Search ................................ 348/207, 231, 348/232, 230, 272, 273, 280; 345/126; H04N 3/14, 5/76, 5/235

(56) References Cited

U.S. PATENT DOCUMENTS

| | | | | |
|---|---|---|---|---|
| 3,814,227 A | * | 6/1974 | Hurd, III et al. | 345/126 |
| 4,882,683 A | * | 11/1989 | Rupp et al. | 345/516 |
| 4,972,495 A | * | 11/1990 | Blike et al. | 382/304 |
| 5,124,537 A | * | 6/1992 | Chandler et al. | 382/318 |
| 5,199,101 A | * | 3/1993 | Cusick et al. | 345/126 |
| 5,270,831 A | | 12/1993 | Parulski et al. | 358/403 |
| 5,448,372 A | | 9/1995 | Axman et al. | 358/342 |
| 5,559,554 A | | 9/1996 | Uekane et al. | 348/333 |
| 5,576,759 A | | 11/1996 | Kawamura et al. | 348/231 |
| 5,619,738 A | | 4/1997 | Petruchik et al. | 396/311 |
| 5,640,627 A | | 6/1997 | Nakano et al. | 396/296 |
| 5,671,440 A | * | 9/1997 | Curry | 345/437 |
| 5,764,291 A | | 6/1998 | Fullam | 348/362 |
| 5,796,875 A | * | 8/1998 | Read | 382/261 |
| 5,831,872 A | * | 11/1998 | Pan et al. | 348/384 |
| 5,900,909 A | * | 5/1999 | Parulski et al. | 348/232 |

* cited by examiner

*Primary Examiner*—Ngoc-Yen Vu
(74) *Attorney, Agent, or Firm*—Sawyer Law Group LLP

(57) ABSTRACT

A method and system for providing data transfers which support image rotation is disclosed. In one aspect, the method and system include determining the orientation of the image capture device and transferring the data from a memory in an order. The order depends on the orientation of the image capture device. In a second aspect, the method and system include determining the orientation of the image capture device and defining an image area of the image sensor based on the orientation of the image capture device. In a third aspect, the method and system include transferring data in a plurality of computational units and processing each computational unit of the plurality of computational units of data. At least a portion of a computational unit is processed while at least a portion of a subsequent computational unit is transferred.

11 Claims, 17 Drawing Sheets

10

| G | R | G | R | G | R | G | R | G | R | G | R | G | R |
|---|---|---|---|---|---|---|---|---|---|---|---|---|---|
| B | G | B | G | B | G | B | G | B | G | B | G | B | G |
| G | R | G | R | G | R | G | R | G | R | G | R | G | R |
| B | G | B | G | B | G | B | G | B | G | B | G | B | G |
| G | R | G | R | G | R | G | R | G | R | G | R | G | R |
| B | G | B | G | B | G | B | G | B | G | B | G | B | G |
| G | R | G | R | G | R | G | R | G | R | G | R | G | R |
| B | G | B | G | B | G | B | G | B | G | B | G | B | G |
| G | R | G | R | G | R | G | R | G | R | G | R | G | R |
| B | G | B | G | B | G | B | G | B | G | B | G | B | G |
| G | R | G | R | G | R | G | R | G | R | G | R | G | R |
| B | G | B | G | B | G | B | G | B | G | B | G | B | G |

13

Prior Art

| | G | R | G | R | G | R | G | R | G | R | G | R | G | R |
|---|---|---|---|---|---|---|---|---|---|---|---|---|---|---|
| 712— | B | G | B | G | B | G | B | G | B | G | B | G | B | G |
| | G | R | G | R | G | R | G | R | G | R | G | R | G | R |
| | B | G | B | G | B | G | B | G | B | G | B | G | B | G |
| | G | R | G | R | G | R | G | R | G | R | G | R | G | R |
| 700— | B | G | B | G | B | G | B | G | B | G | B | G | B | G |
| | G | R | G | R | G | R | G | R | G | R | G | R | G | R |
| | B | G | B | G | B | G | B | G | B | G | B | G | B | G |
| | G | R | G | R | G | R | G | R | G | R | G | R | G | R |
| | B | G | B | G | B | G | B | G | B | G | B | G | B | G |
| | G | R | G | R | G | R | G | R | G | R | G | R | G | R |
| | B | G | B | G | B | G | B | G | B | G | B | G | B | G |

METHOD AND SYSTEM FOR ORGANIZING DMA TRANSFERS TO SUPPORT IMAGE ROTATION

FIELD OF THE INVENTION

The present invention relates to a method digital cameras and more particularly to a method and system for providing DMA transfers which support image rotation in a digital camera.

BACKGROUND OF THE INVENTION

Conventional digital cameras capture an image using a charge-coupled device (CCD) array. The raw data in the CCD array may be transferred to a buffer or other component in the digital camera. Such transfers of data, particularly direct memory access ("DMA") transfers of data, typically start at a particular pixel in the CCD array. The DMA takes this base pixel, transfers each pixel in the line, and repeats the process for the remaining lines of pixels in the CCD array.

Similarly, when transferring data from a buffer to another component, DMA typically begins with a base address and transfers a number of sequential addresses. The first data transferred typically corresponds to the base pixel of the CCD array. Once the data is transferred from the buffer, color conversion and compression is performed. The image is then stored in memory or provided to the user, typically on a liquid-crystal display (LCD) screen.

In order to perform image processing, color interpolation is also performed. Each pixel in a CCD array is typically sensitive to only one color of light. However, the image is usually made up of at least three colors, for example red, green, and blue. To supply data on the colors not captured by a particular pixel, color interpolation on data from surrounding pixels is typically performed during image processing.

The images captured by such conventional digital cameras could be either portrait or landscape images. Portrait images are those images having a height greater than the width. Landscape images typically have a width greater than height. A user typically captures a landscape image by keeping the digital camera in a standard upright orientation. A portrait image is captured by rotating the camera either right or left prior to capturing the image.

Although conventional digital cameras are capable of capturing both landscape and portrait images, conventional transfers of data are insensitive to rotation of the image. For example, DMA transfers of data begin at the same point in the buffer storing the raw image data irrespective of whether the image is a portrait or a landscape image. Similarly, the image data is processed without regard to the orientation of the digital camera during image capture. Therefore, when the image is displayed on the LCD screen, the orientation of the image is the same as when the image was captured. Consequently, in order to view a portrait image in the proper orientation, a user must either rotate the digital camera or manually rotate the image to the right or the left. Even where the user can manually rotate the image, multiple frame buffers are typically required.

Accordingly, what is needed is a system and method for providing data transfers which allow automatic image rotation. It would also be beneficial if the system and method consumed a small amount of the digital camera's resources, such as bus bandwidth. Finally, it would be desirable if the system was capable of being implemented using a single frame buffer. The present invention addresses such a need.

SUMMARY OF THE INVENTION

The present invention provides a method and system for providing data transfers which support image rotation. In one aspect, the method and system comprise determining the orientation of the image capture device and transferring the data from a memory in an order. The order depends on the orientation of the image capture device. In a second aspect, the method and system comprise determining the orientation of the image capture device and defining an image area of the image sensor based on the orientation of the image capture device. In a third aspect, the method and system comprise transferring data in a plurality of computational units and processing each computational unit of the plurality of computational units of data. At least a portion of a computational unit is processed while at least a portion of a subsequent computational unit is transferred.

According to the system and method disclosed herein, the present invention provides a method and system for transferring data which supports image rotation, thereby increasing overall system performance.

BRIEF DESCRIPTION OF THE DRAWINGS

FIG. 1 is a diagram of a Bayer array of an image sensor.

FIG. 10 is a diagram illustrating the image area and unused area of a color filter array.

Figures 18A, 18C:
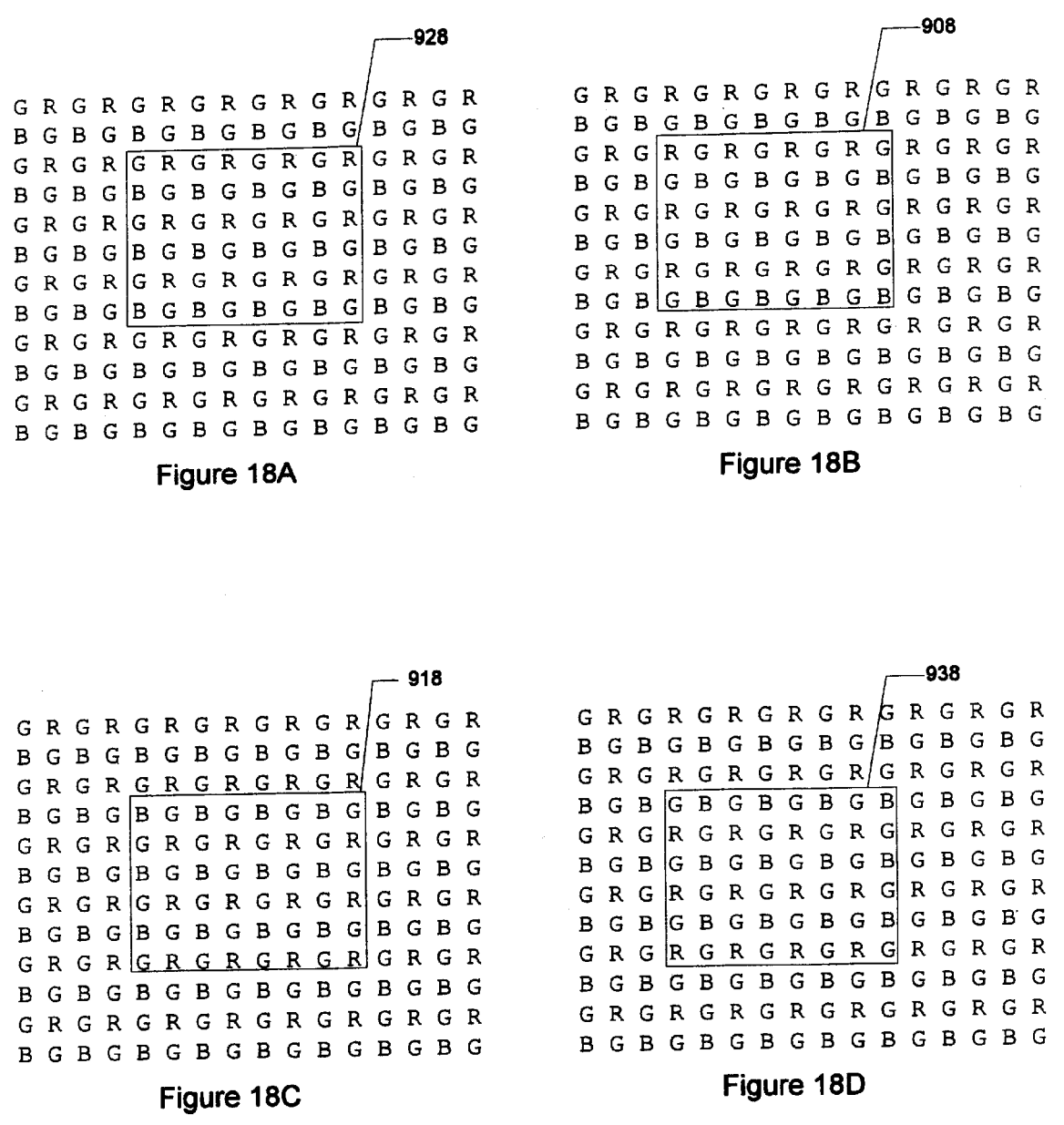

FIGS. 18A–18D are block diagrams of one embodiment of the pixel offset in accordance with the method and system.

DETAILED DESCRIPTION OF THE INVENTION

Figure 2A:
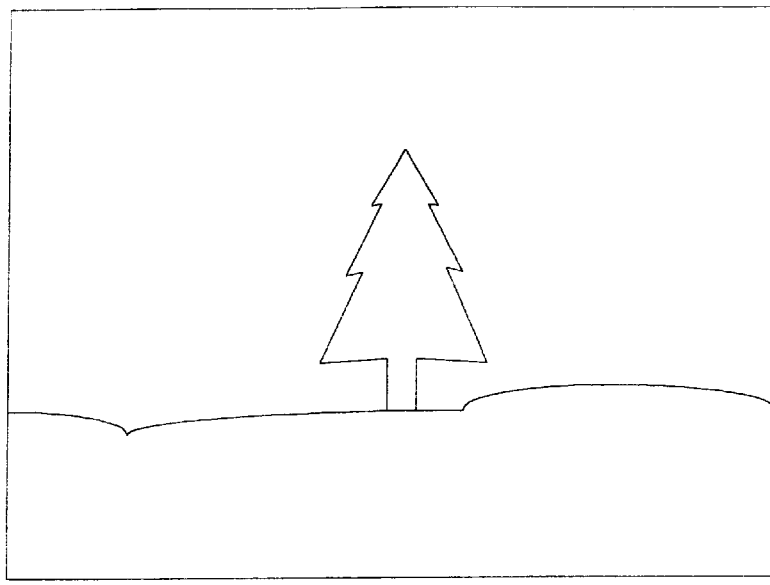
FIG. 2A is a diagram of a landscape image.

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons, and/or other items could incorporate the features described hereinbelow and that device would be within the spirit and scope of the present invention. Thus, the present invention is not intended to be limited to the embodiment shown, but is to be accorded the widest scope consistent with the principles and features described herein.

Conventional digital cameras capture an image using an image sensor, typically charge-coupled device (CCD) array. The user interface for such a camera typically includes a liquid-crystal display (LCD) screen. The functions of the LCD screen include acting as a viewfinder and displaying captured images.

The CCD array itself is typically arranged in a color filter array such as a Bayer array. A conventional Bayer array 10 is depicted in FIG. 1. In such an array, a line of alternating red ("R") and green ("G") pixels is followed by a line of alternating G and blue ("B") pixels. A G pixel in one line is offset one place from a G pixel in the next line. Through the use of the color filter array, information on both the luminance and the color of the image is provided.

Because each pixels in the Bayer array 10 is sensitive to only one color of light, data for the two missing colors must be obtained for each pixel. Typically, this data is generated by interpolating data from surrounding pixels. The image area 13 is made up of pixels comprising the image. In the center of the image area 13, the surrounding pixels used for interpolation are typically within the image area 13. However, near an edge of the image area 13, some pixels used in interpolation are outside of the image area 13. These pixels, which form a ring around the image area 13, are known as ring pixels. As used herein, ring pixels are those pixels used for color interpolation which surround the image area 13.

Raw data for an image is typically transferred from the CCD array to a buffer, then to other components for processing. Transfers of data, particularly direct memory access ("DMA") transfers of data, typically start at a base address and count up for each location transferred. Thus, conventional DMA transfers a set of sequential addresses. For example, a DMA transfer of the Bayer array 10 would generally commence at the G pixel in the upper left corner. The transfer would continue across the top line. Subsequent lines would be transferred from left to right as the DMA counts up for each pixel transferred. DMA transfers from other components would proceed similarly, commencing at a base address and transferring subsequent addresses sequentially.

Figure 2B:
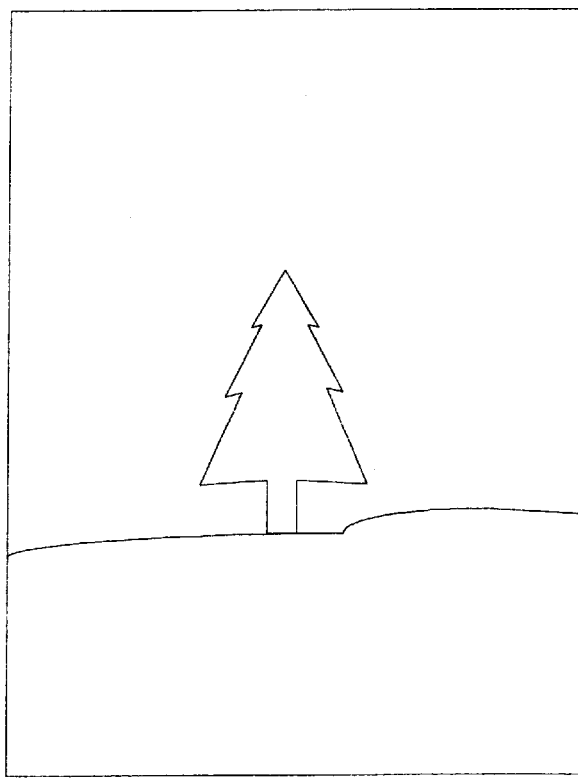
FIG. 2B is a diagram of a portrait image.

Conventional digital cameras can also capture both portrait and landscape images. FIG. 2A depicts a landscape image 11. FIG. 2B depicts a portrait image 12. A user captures a landscape image by keeping the digital camera in an upright orientation. In contrast, a portrait image is captured by rotating the camera either right or left by approximately ninety degrees prior to capturing the image. A user captures a left rotation portrait image by rotating the camera left by approximately ninety degrees before capturing the image. A right rotation portrait image is captured by rotating the camera right by approximately ninety degrees before capturing the image. A user can also capture an inverted landscape image by capturing the image while the camera lens is upside down.

Although conventional digital cameras can capture portrait or landscape images and transfer the data for these images between components, one of ordinary skill in the art will realize that the ability of a user to easily view portrait images is restricted.

As discussed above, DMA transfers of data typically begin at a particular address. Each address is transferred sequentially, typically right to left across a line and from the bottom to the top of the memory. Data is DMA transferred in this order from the CCD array or from the buffer regardless of the orientation of the camera. Thus, irrespective of whether an image is a portrait image or a landscape image, data will be transferred from the CCD array in the same manner.

Typically, the first line transferred corresponds to the top of the image when the camera is not rotated. When the camera is rotated, the first line of data transferred does not correspond to the top of the image. The image processing does not change with camera orientation. As a result, the orientation of the image displayed on an LCD is the same regardless of whether the image is a landscape or a portrait image. To view a portrait image in the proper orientation, a user must manually rotate the image. In some conventional digital cameras, the user manually rotates the image by rotating the digital camera to the right or the left. In other conventional cameras, a user can manually rotate images within the camera. However, conventional digital cameras do not automatically rotate the image.

The present invention provides a method and system for providing data transfers which support automatic image rotation. The method and system transfer data in an order which depends on the orientation of the image. Although the method and system will be described in terms of a particular method for providing sufficient pixels for interpolation of colors, one of ordinary skill in the art will recognize that the method and system are not limited to the described methods. In addition, although the present invention is described in terms of a DMA transfer, one of ordinary skill in the art will realize that the method and system are not limited to DMA transfers.

Figure 3:
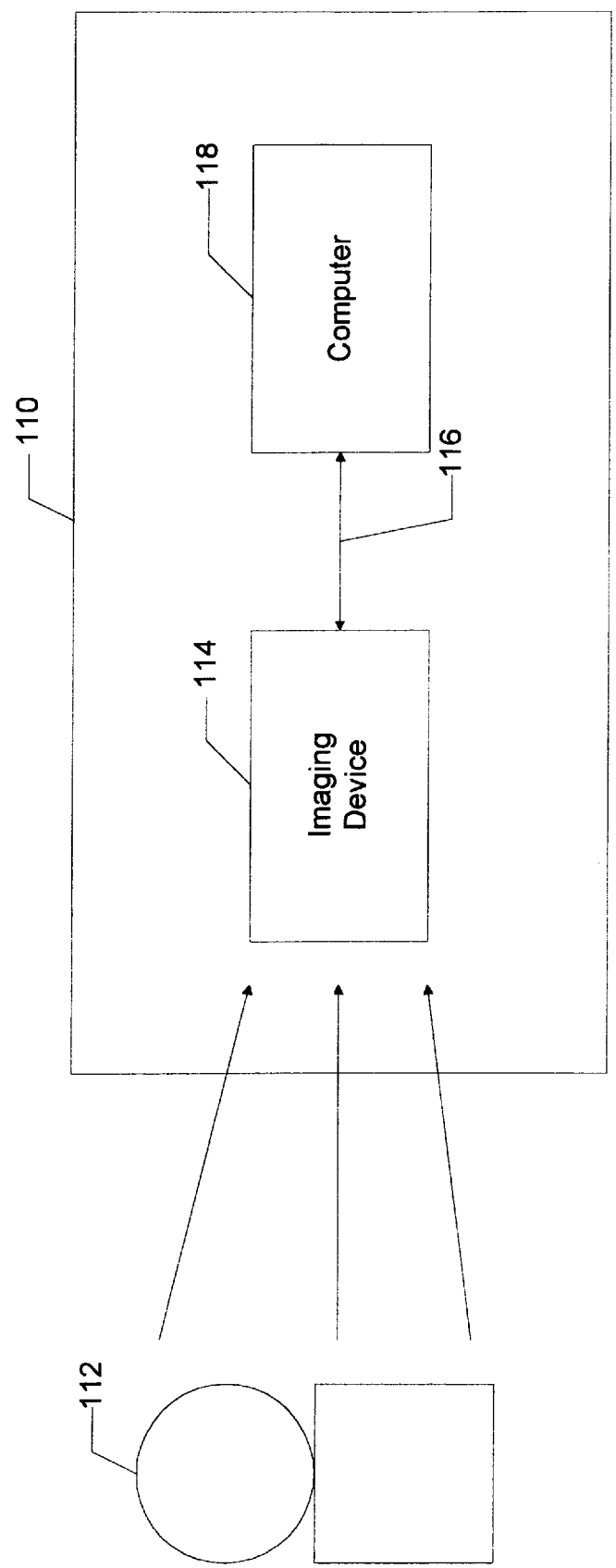
FIG. 3 is a block diagram of a digital camera that operates in accordance with the present invention.

Referring now to FIG. 3, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 4:
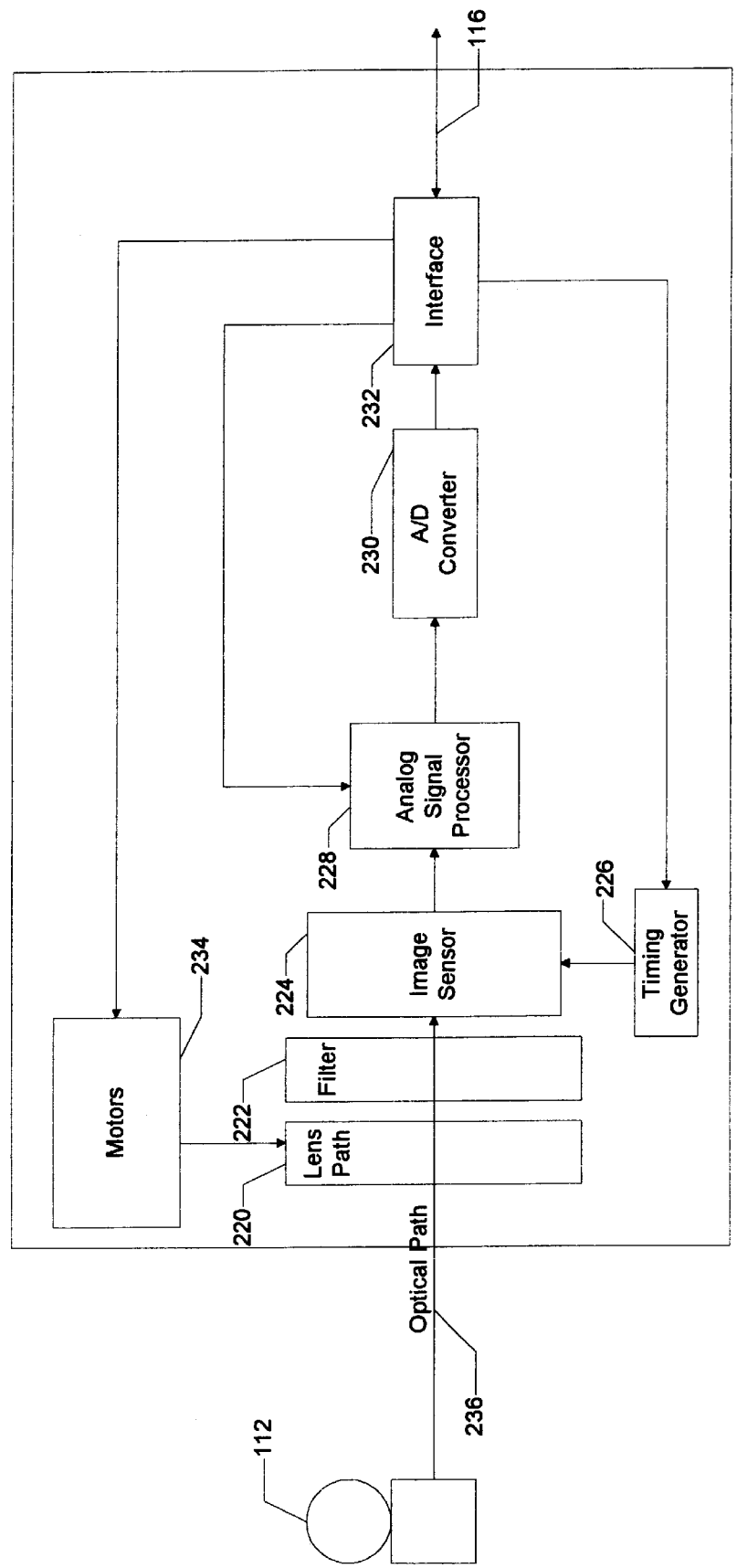
FIG. 4 is a block diagram of one embodiment for the imaging device of FIG. 3.

Referring now to FIG. 4, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 5:
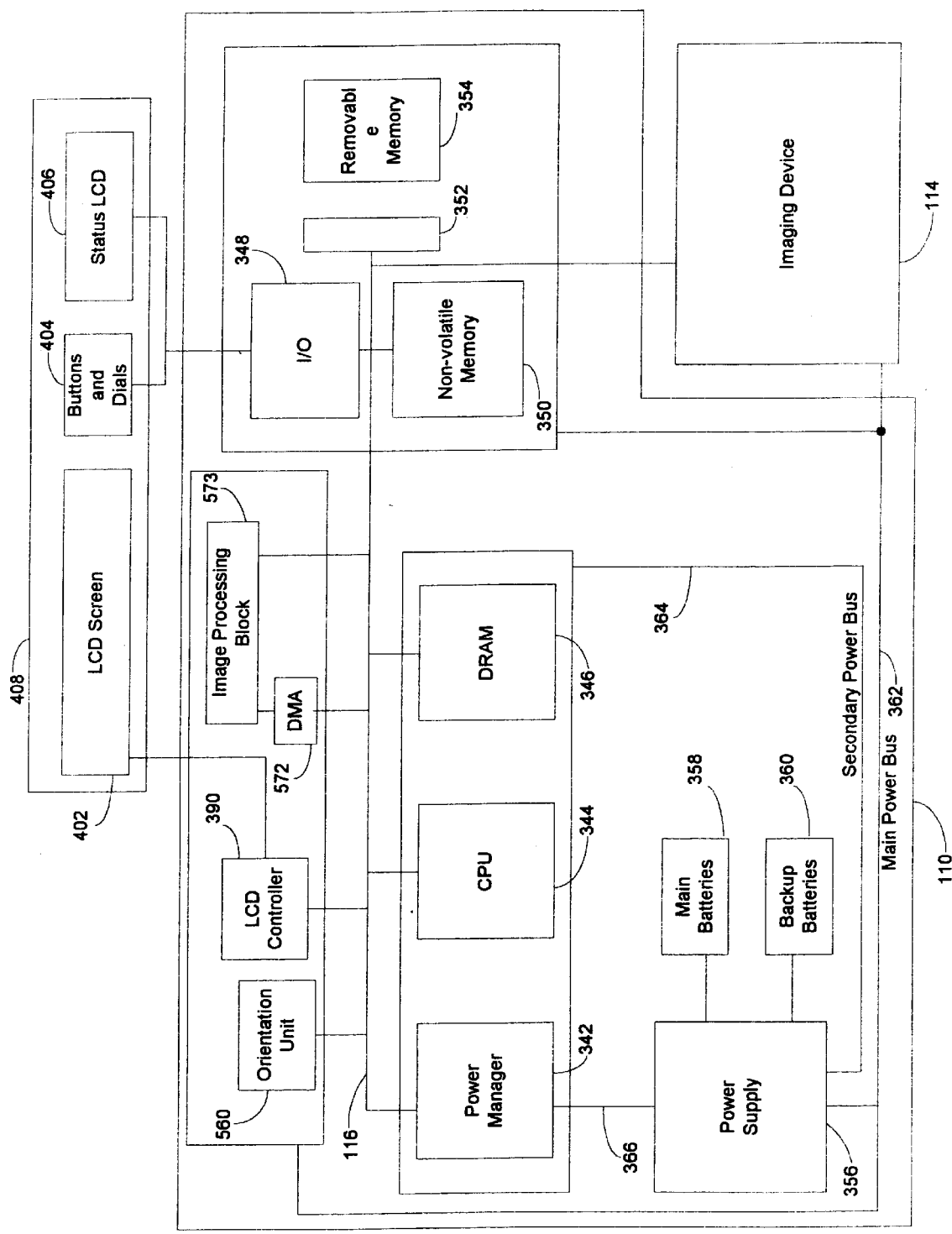
FIG. 5 is a block diagram of one embodiment for the computer of FIG. 3, where image processing is done at least partially in hardware.

Referring now to FIG. 5, a block diagram of one embodiment for computer 118 is shown. The computer 118 in FIG. 5 provides at least a portion of image processing in hardware using image processing block 573. Thus, the computer 118 has DMA unit 572 for transfers of data to and from the image processing block 573. However, nothing prevents the method and system from being used in a camera 110 which processes image data in software. In such a system, the image processing block 573 would be omitted. In one embodiment, DMA 572 is programmable by the central processing unit (CPU) 344.

System bus 116 provides connection paths between imaging device 114, an optional power manager 342, CPU 344, dynamic random-access memory (DRAM) 346, input/output interface (I/O) 348, non-volatile memory 350, DMA 572, image processing block 573, orientation unit 560, and buffers/connector 352. Removable memory 354 connects to system bus 116 via buffers/connector 352. Alternately, camera 110 may be implemented without removable memory 354 or buffers/connector 352. The orientation unit 560, discussed more fully below, can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, non-volatile memory 350, LCD controller 390, orientation sensor 560, DMA 572, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 6:
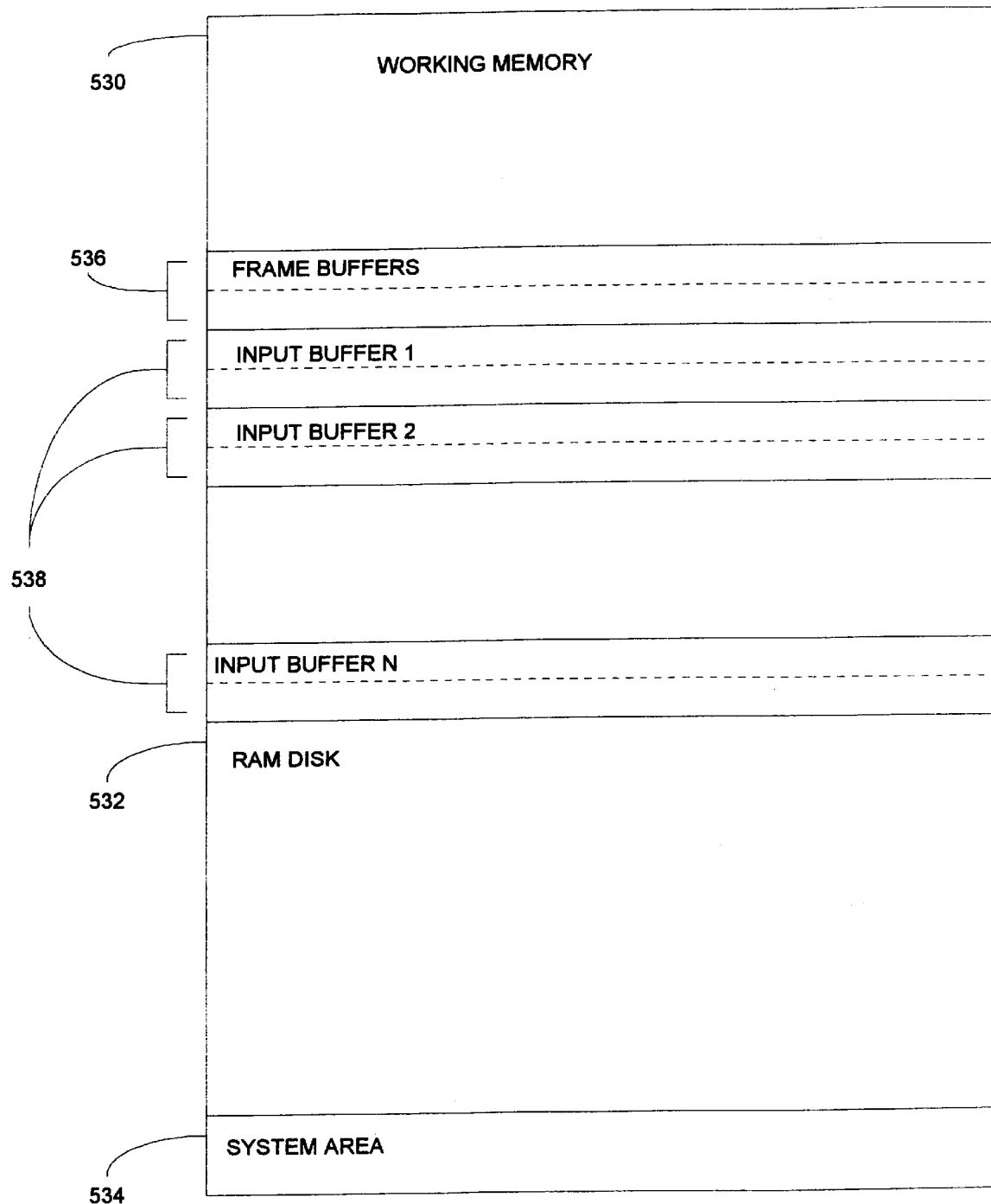
FIG. 6 is a memory map showing one embodiment of the Dynamic Random-Access-Memory (DRAM).

Referring now to FIG. 6, a memory map showing one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a "sectored" format similar to that of conventional hard disk drives. In one embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Figure 7B:
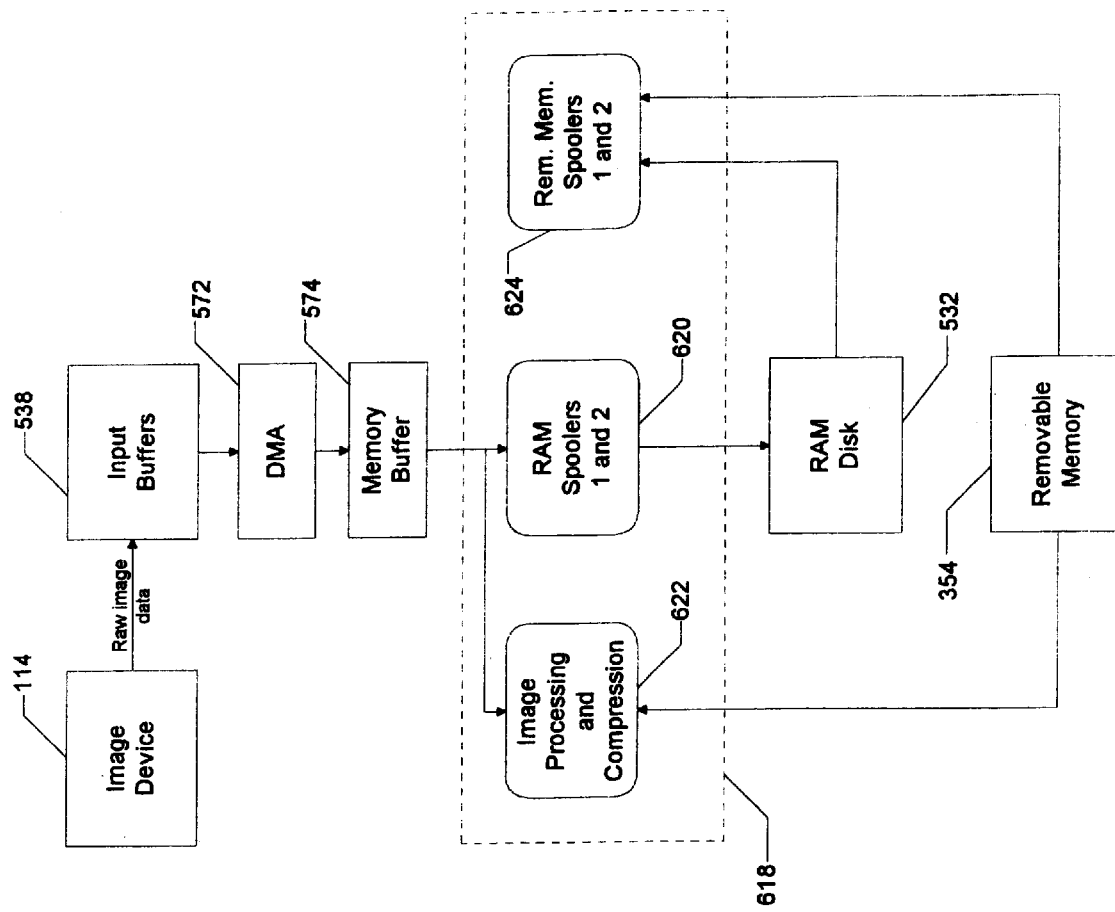
FIG. 7B is a block diagram illustrating the image file generation process where image processing is performed by software, which begins when the camera is in capture mode and the user presses a shutter button to capture an image.
Figure 7A:
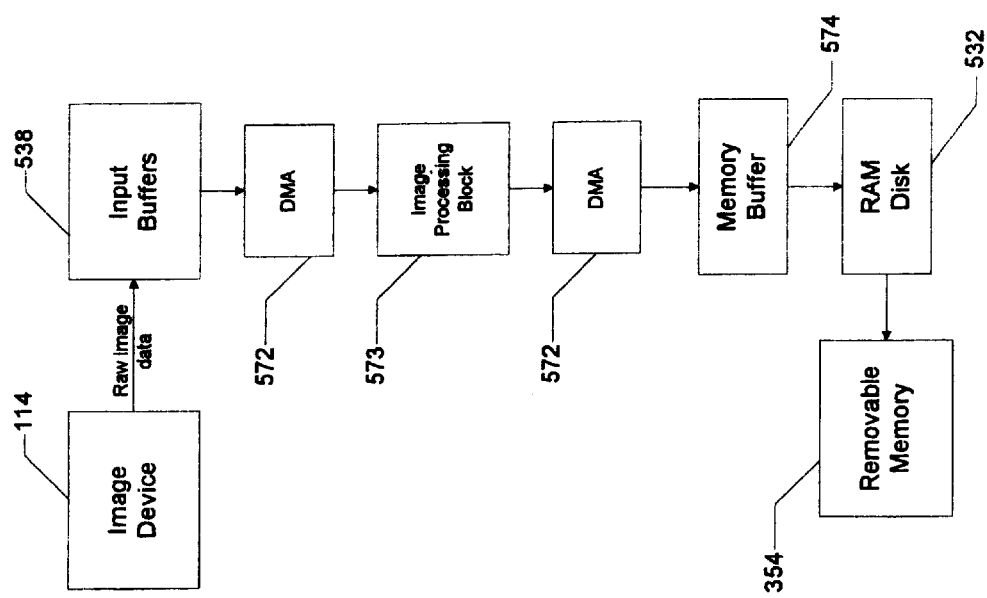
FIG. 7A is a block diagram illustrating the image file generation process performed at least partially by hardware, which begins when the camera is in capture mode and the user presses a shutter button to capture an image.

Referring now to FIG. 7A, a block diagram of a portion of the process for generating an image file is shown. Image generation for the process shown in FIG. 7A is accomplished in hardware by image processing block 573. The process for generating an image file begins when the camera is in capture mode and the user presses a shutter button (not shown) to capture an image. The raw image data is captured by the CCD array 224 in the image device 114 at a resolution set by the user and the raw image data is stored into an appropriate number of input buffers 538. In a preferred embodiment, the raw image data is transferred from the CCD array 224 to the input buffers 538 via a DMA transfer. The raw data in input buffers 538 is then transferred via DMA 572 to the image processing block 573. When image processing is complete, DMA 572 transfers the completed image file to a memory buffer 574. The image file is then transferred to RAM disk 532 or to removable memory 534.

Referring now to FIG. 7B, a block diagram is shown of an alternate embodiment of a portion of the image file generation process where part of the image processing is accomplished in software. As in FIG. 7A, the image file generation process begins when the camera is in capture mode and the user presses a shutter button (not shown) to capture an image. The transfer of data to image buffers 538 from the imaging device 114 is performed in the same manner as for the process in FIG. 7A.

The raw data in input buffers 538 is transferred to a memory buffer 574 via DMA 572. The raw data is then transferred to background spooling 618 process for image processing and storage. As used herein, a spooler is a process that transfers data from one process or device to a second process or device. The details of the spooling process 618 are omitted for brevity. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

A method and system for determining the orientation of a digital camera has been disclosed in co-pending U.S. Patent Application Serial No. 08/795,587 entitled "Apparatus and Method for Camera Image and Orientation Capture" filed on Feb. 6, 1997 and assigned to the assignee of the present application. Rotation of captured images has been disclosed in U.S. Patent Application Serial No. 08/903,898 entitled "A Method and System For Auto-Rotating a Graphical User Interface For Managing Portrait and Landscape Images in an Image Capture Unit" filed on Jul. 31, 1997, and assigned to the assignee of the present application. Applicant hereby incorporates by reference the above-mentioned co-pending applications.

Figure 8:
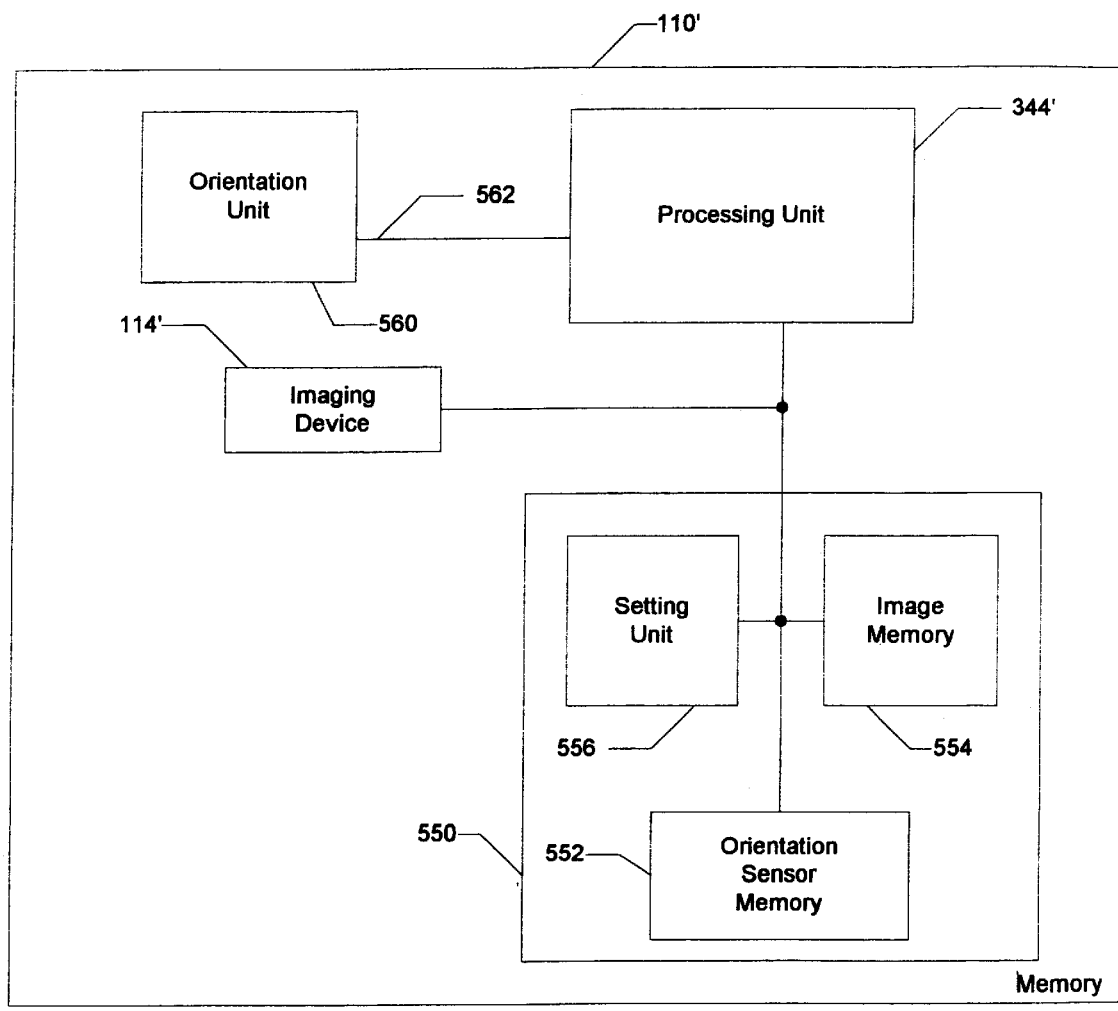
FIG. 8 is a block diagram depicting a portion of one embodiment of a digital camera including an orientation unit.

FIG. 8 depicts a portion of one embodiment of the camera 110' including an orientation unit 560. Components similar to those discussed with respect to FIGS. 3 through 5 are labeled similarly. The digital camera 110' includes a processing unit 344' having at least one orientation input, at least one setting input and a bidirectional communications port. The digital camera 110' also includes a memory 550 and an imaging device 114'. The orientation unit 560 has at least one orientation output. The memory 550 includes an image memory 554, a setting unit 556, and an orientation memory 552. The memory 550 can be included in one or more of the components of the camera 110, including the DRAM 346 or the non-volatile memory 350. In a preferred embodiment, the orientation unit 560 is implemented in the digital camera 110 shown in FIG. 5.

Each orientation output of the orientation unit 560 is coupled to a corresponding orientation input of the processing unit 344' via an orientation signal line 562. The bidirectional communication port of the processing unit 344', the memory 550, and the output of the imaging device 114' are coupled via common bus 116'. In an alternative embodiment, the orientation unit 560 may also be coupled to the processing unit 344' through the common bus 116'. The processing unit 344', the imaging device 114', the orientation unit 560, and the memory 550 are also coupled to a power source (not shown).

In one embodiment, the orientation unit 560 includes first and second orientation sensors (not shown). In this embodiment, the first orientation sensor determines whether the camera 110' is rotated to the left or right. Thus, the first orientation sensor determines whether the camera has been rotated to a left rotation portrait, a right rotation portrait, or an upright position. In this embodiment, the first orientation sensor outputs a left orientation signal for left rotation portraits and a right orientation signal for right rotation portraits. The second orientation sensor determines whether the camera 110' is tilted forward or backward. In such an embodiment, the second orientation sensor outputs a forward and a backward orientation signal. In one embodiment, the orientation unit 560 is also capable of outputting an inverted orientation signal when a switch (not shown) indicates that the lens 220 of the camera 110' is rotated by one hundred and eighty degrees.

Although a preferred embodiment uses the orientation of the lens 220 to determine the orientation of an image, nothing prevents the method and system from using the orientation of the camera 110' or the orientation of any portion of the camera 110' to determine if the image is inverted. Similarly, nothing prevents the camera 110' from integrating two or more functions of the orientation sensors and switch into a single component.

Figure 9:
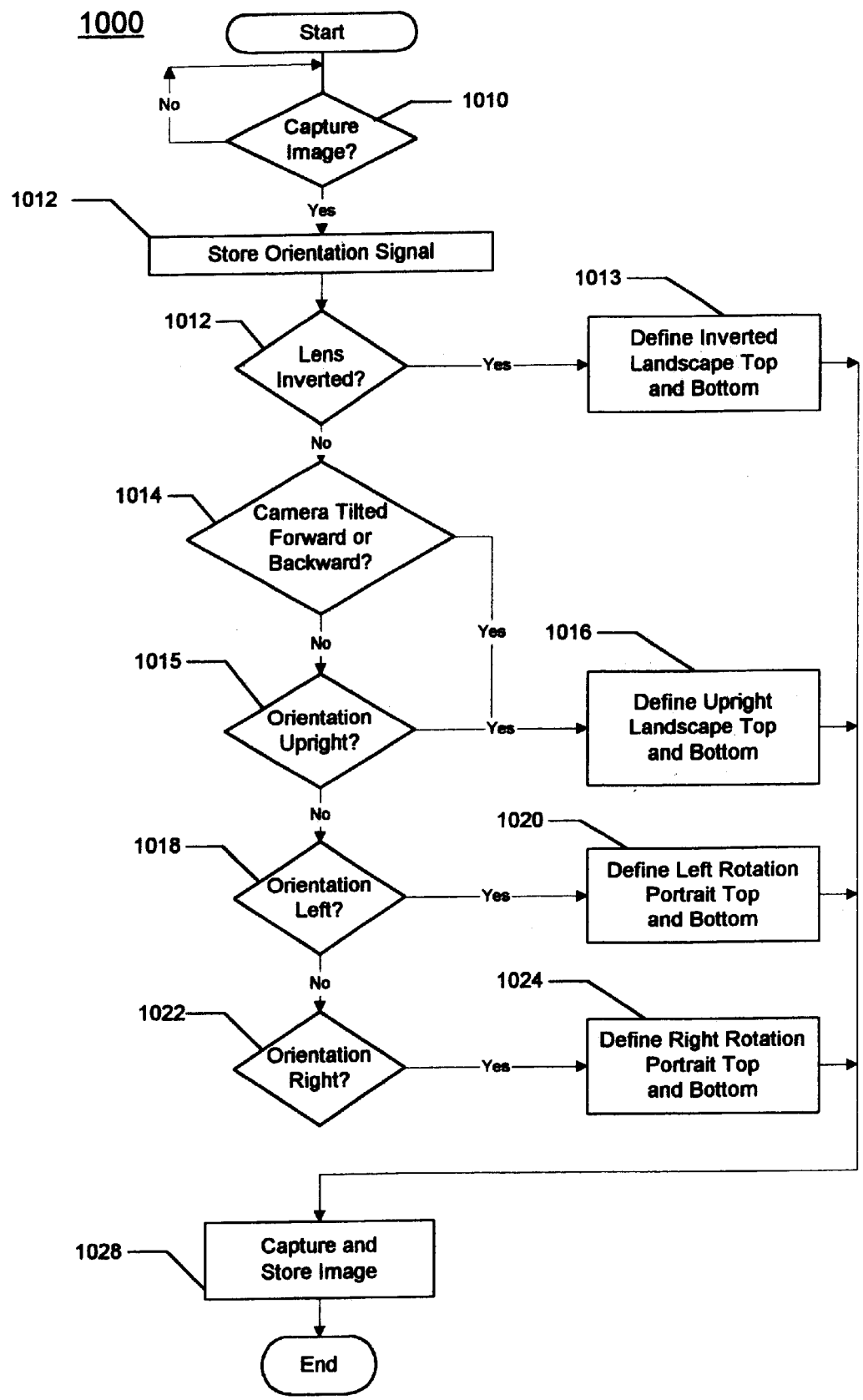
FIG. 9 is a flow chart of one embodiment of a method for camera image and orientation capture.

Referring now to FIG. 9, a flow chart of one method 1000 for camera image and orientation capture is shown. The method 1000 is used for capture of four orientations: upright, inverted, left orientation (for a left rotation portrait image), and right orientation (for a right rotation portrait image). First, the processing unit 344' determines whether the image is to be captured via step 1010. In one embodiment, this determination is made based on ascertaining whether a shutter button (not shown) has been depressed. The processing unit 344' may determine whether the shutter button has been depressed by monitoring the value of a shutter activation signal (not shown). If an image is not to be captured, then subsequent steps are not executed.

If an image is to be captured, the processing unit 344' stores the orientation signals from the orientation sensors and switch in the orientation signal memory 552 via step 1011. In one embodiment, the stored orientation signals include the left, right, and inverted orientation signals as well as the forward and backward orientation signals. In a preferred embodiment, the forward and backward orientation signals are not generated or processed.

The setting unit 556 receives the orientations signals and determines if the lens 220 of the camera 110' is inverted via step 1012. If the lens 220 is inverted, the image is defined to be an inverted landscape via step 1013. If the lens 220 is not inverted, then the setting unit 556 determines if the camera 110' is in a forward or backward orientation via step 1014. If the camera 100' is in a forward or backward orientation, the image is defined to be an upright landscape via step 1016. The image is so defined because where the camera is tilted forward or backward, whether the image is a conventional portrait image or a landscape image may be difficult to determine. In addition, in one embodiment, the sensor for determining left and right orientation (not shown) may not operate properly when the camera 110' is tilted forward or backward.

Next, the setting unit 556 determines whether the camera 110' is in an upright orientation in step 1015. If the camera 110' is in an upright orientation, the setting unit 556 defines the top portion and the bottom of the image as the top and bottom, respectively, of an upright landscape image via step 1016.

If the setting unit 556 determines in step 1015 that the camera 110' is not in an upright orientation, then the setting unit 556 determines whether the camera 110' is in a left orientation in step 1018. If the camera 110' is in a left orientation, the setting unit 556 defines the top and bottom of the image as the top and bottom, respectively, of a left rotation portrait image via step 1020.

If the setting unit 556 determines in step 1018 that the camera 110' is not in a left orientation, then the setting unit 556 determines whether the camera 110' is in a right orientation in step 1022. Note that this step may be omitted where a right orientation is the only remaining orientation. If the camera 110' is in a right orientation, the setting unit 556 defines the top and bottom of the image as the top and bottom, respectively, of a right rotation portrait image via step 1024.

After each of the steps 1013, 1016, 1020, or 1024, the processing unit 344' issues an image capture command via step 1028, transferring the pixel signals output by the imaging device 114' to the image memory 554'.

In a preferred embodiment, the orientation unit 560 and its functions are implemented in the camera 110 as shown in FIG. 5. Portions of the memory 550, such as image memory 554, may be included in the DRAM 346. In addition, the functions of the setting unit 556, such as determining the orientation of the camera and setting the top and bottom of the image, may be performed by another component, such as the CPU 344. In addition, the orientation unit 560 may communicate to the CPU 344 through the system bus 116 rather than a dedicated line. Certain functions and components of the camera 110, such as the input buffers 538, frame buffer 536, or image processing and compression, are not discussed with respect to the method 1000. However, in a preferred embodiment, these functions are performed in conjunction with the method 1000. Consequently, the method 1000 is independent of the hardware used. Finally, the method 1000 may be used to define, for example, only the top or the bottom of a particular image rather than both the top and the bottom of the image. By using the orientation unit 560, the digital camera 110 is capable not only of capturing the orientation of an image but also rotating the image, for example to be in an upright orientation regardless of the orientation of the camera 110 during image capture.

The present invention provides a method and system for providing data transfers, such as DMA transfers, which support image rotation. In order to support image rotation, the method and system comprise transferring data in an order that depends on the image orientation. Thus, the same portion of the image is transferred first, regardless of the orientation of the camera 110 during image capture. The present invention will primarily be described in terms of DMA transfers from the input buffer 538 for image processing. However, one of ordinary skill in the art will readily recognize that this method and system will operate effectively for other methods of transferring data.

In one embodiment, data is transferred from the CCD array 224 to the input buffers 538 in a conventional manner. Therefore, a DMA transfer provides of each line of pixels in the CCD array 224. The DMA transfer preferably begins the transfer at the pixel in the CCD array 224 corresponding to the upper left corner of the image. Because the lens 220 inverts the image, the pixel corresponding to the upper left corner of the image is in the lower right corner of the CCD array. The DMA transfer proceeds from right to left across each line and from the bottom line to the top line of pixels in the CCD array 224. Because data is transferred in this order, data in the starting memory location in the input buffers 538 corresponds to the upper left corner of the image.

Once the data for an image is in the input buffers 538, the data is transferred to other components, for example to the image processing block 573. Without image rotation, conventional DMA can transfer data from the input buffers 538 to the image processing block 573 at a relatively high speed. However, conventional DMA transfers are not sensitive to the image rotation. Even where image rotation is supported, conventional data transfers would be slow, for example transferring only one pixel per read cycle. Consequently, the method and system include modifying the DMA transfer to allow a relatively high speed transfer of data from the input buffers 538 in an order which depends on the image orientation.

In addition to accounting for image rotation, the DMA transfer also ensures that sufficient data for image processing is provided while reducing consumption of system resources. To more particularly illustrate this aspect of the method and system in accordance with the present invention, refer now to FIG. 10 illustrating a Bayer array in which the CCD array 224 may arranged. The image is formed from the pixels in the image area 700. Consequently, the image size is defined by the image area 700. The CCD array 224 also includes an unused area 710 containing pixels that may not be used for providing the image. For example, where the resolution of an image is 640×480 pixels, the image area 700 is 640×480 pixels. However, the CCD array 224 is typically on the order of 690×502 pixels.

As discussed previously, color interpolation is performed for each of the pixels in the image area 700. Any number of the surrounding pixels can be utilized for interpolation of a single pixel. In a preferred embodiment, a 5×5 array of pixels is used to obtain interpolation data for each pixel in the image area 700. In addition, in the preferred embodiment, all of the surrounding pixels in the 5×5 array are used for interpolation. As discussed above, not all of the pixels in a 5×5 interpolation array are in the image area 700 for the pixels at the edges of the image area 700. As a result, data for the ring pixels beyond the edge of the image area 700 is obtained. Because a 5×5 array are used for interpolation in a preferred embodiment, the ring pixels for such an embodiment are two rows or two columns deep.

To obtain the ring pixels two methods may be employed. A first, preferred method for providing ring pixels generates the ring pixels in software or hardware after the data is read in from the CCD array 224. Thus, in a preferred embodiment, only data from the image area 700 is transferred to the input buffers 538. Generating ring pixels in software is preferred because as the camera 110 is provided with more features, the calculations required for reading and manipulating the data from additional pixels in the CCD array 224 become increasingly difficult.

The effect of the ring pixels is greatest on the rows and columns comprising the edges of the image area 700, drops markedly one row or column from an edge, and is nonexistent closer to the interior of the image area 700. Thus, in a preferred embodiment, the ring pixels are generated in software by repeating the color and data in the two rows and two columns closest to an edge of the image area 700. Consequently, a nearest neighbor algorithm, which repeats the data in the nearest two rows or columns, may be used to generate the ring pixels.

A second method for providing ring pixels uses pixels outside of the image area 700. To provide the ring pixels from the CCD array 224, both the data from the image area 700 and data from a ring of pixels 712 are transferred to the input buffers 538. In a preferred embodiment, the ring 712 is two pixels thick. Thus, for an image area 700 that is 640×480 pixels in size, an array of 644×484 pixels is transferred to the input buffers 538. Consequently, the transfer between the CCD array 224 and the input buffers 538 is modified to transfer more pixels per line and a larger number of lines. One benefit of reading in ring pixels from the unused area 710 is that the actual data from the ring pixels is provided.

Irrespective of whether ring pixels are generated in software or transferred from the CCD array 224, the DMA 572 that transfers data from the input buffers 538 to the image processing block 573 is modified. In a preferred embodiment, a 16×16 byte block of data is desired for image processing. However, to provide color interpolation, a 20×20 byte block is used. To minimize the bus bandwidth, data from the input buffers 538 are transferred in computational units ("CU") which are larger than the minimum size (20×20 bytes) needed to process a single 16×16 byte block of data.

In a preferred embodiment, the DMA 572 transfers data from the input buffers 538 in bursts. In a preferred embodiment, a burst of up to eight data words of four bytes per word is supported. Therefore, CUs of up to thirty-two bytes in width can be transferred. In the preferred embodiment, each CU transferred is thirty two bytes in width to minimize the bus bandwidth. However, the method and system also function where bursts of other lengths including shorter bursts, for example up to four data words, are supported.

Figure 11:
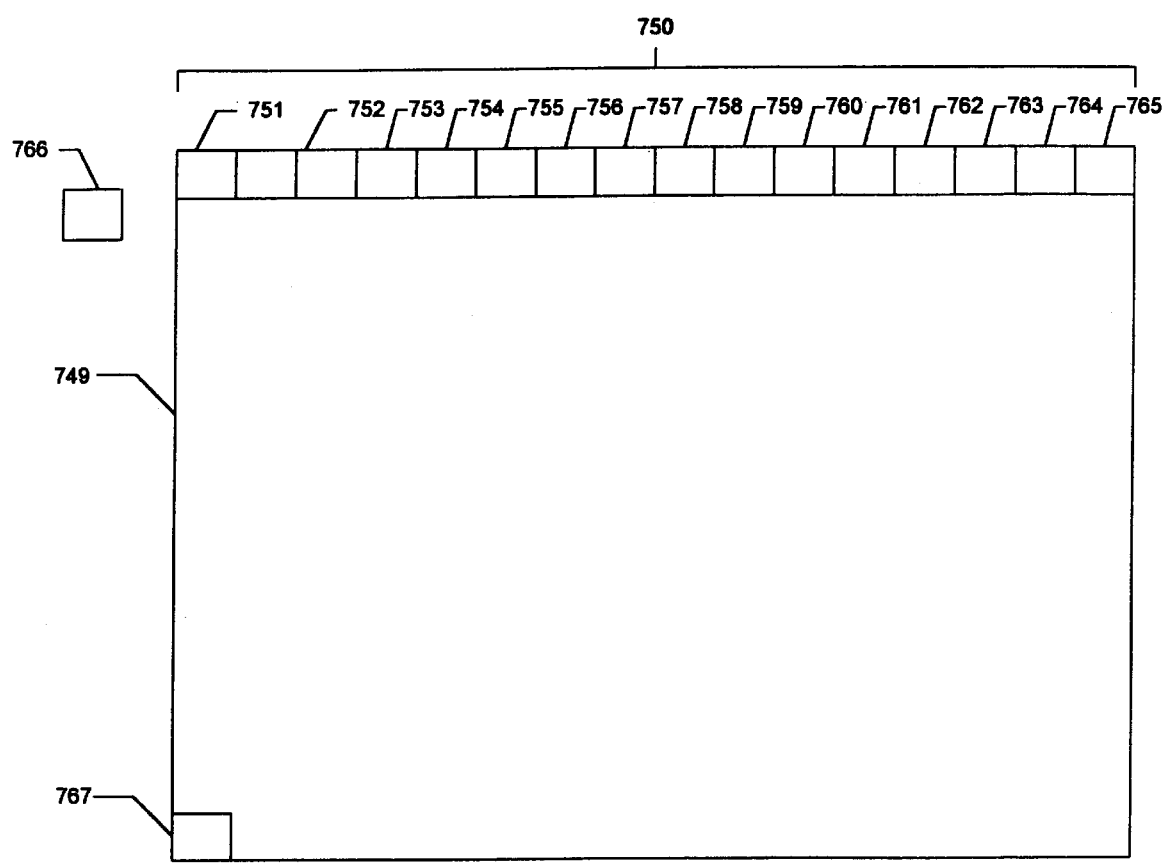
FIG. 11 is block diagram depicting how data are transferred from an input buffer when ring pixels are inserted by software or hardware.

FIG. 11 is a block diagram depicting how a preferred embodiment of the method and system read the area 749 of the input buffers 538 where ring pixels are provided by software or hardware and the image is a landscape image. Because the ring pixels are inserted by software or hardware, only the image area 700 of FIG. 10 is transferred to the input buffers 538. The width of the area 749 in FIG. 11 is a multiple of sixteen or thirty two.

The DMA 572 transfers data in CUs and transfers CUs sequentially to form a scan. The data read in the first scan by DMA 572 are depicted in area 750. The first scan 750 transfers only eighteen lines of data. Eighteen lines of data are transferred because the two additional rows of ring pixels, which would be above the scan 750, are inserted by software or hardware. In a preferred embodiment, each CU is thirty two bytes wide. Thus, CUs 751 through 765, as well as CUs 766 and 767, are thirty two bytes wide. Data for the ring pixels at the leading edge of the first CU and at the final edge of the last CU in each scan are inserted by software or hardware.

In the interior of the area 749, each scan is twenty lines high. For example, the second scan beginning at CU 766 transfers twenty lines for each CU. The scans in the interior of the area 749 are twenty lines deep to provide all the data required for color interpolation. Each scan also overlaps a previous scan by four lines. For example, CU 766 overlaps CU 751 by four lines. The last scan starting at CU 767 at the bottom of the area 750 is eighteen lines deep. The two lines of data for ring pixels for the last scan, which would be below the area 749, are inserted by software or hardware. Note, however, where the image height 700 is not a multiple of 16 pixels, the last scan may be less than eighteen lines deep.

Because the area 749 has a width that is a multiple of sixteen or thirty two, and a CU is thirty two bytes wide, the edge of the area 749 is on a boundary for DMA transfers. As a result, there are no empty addresses in the last CU of each scan.

Figure 12:
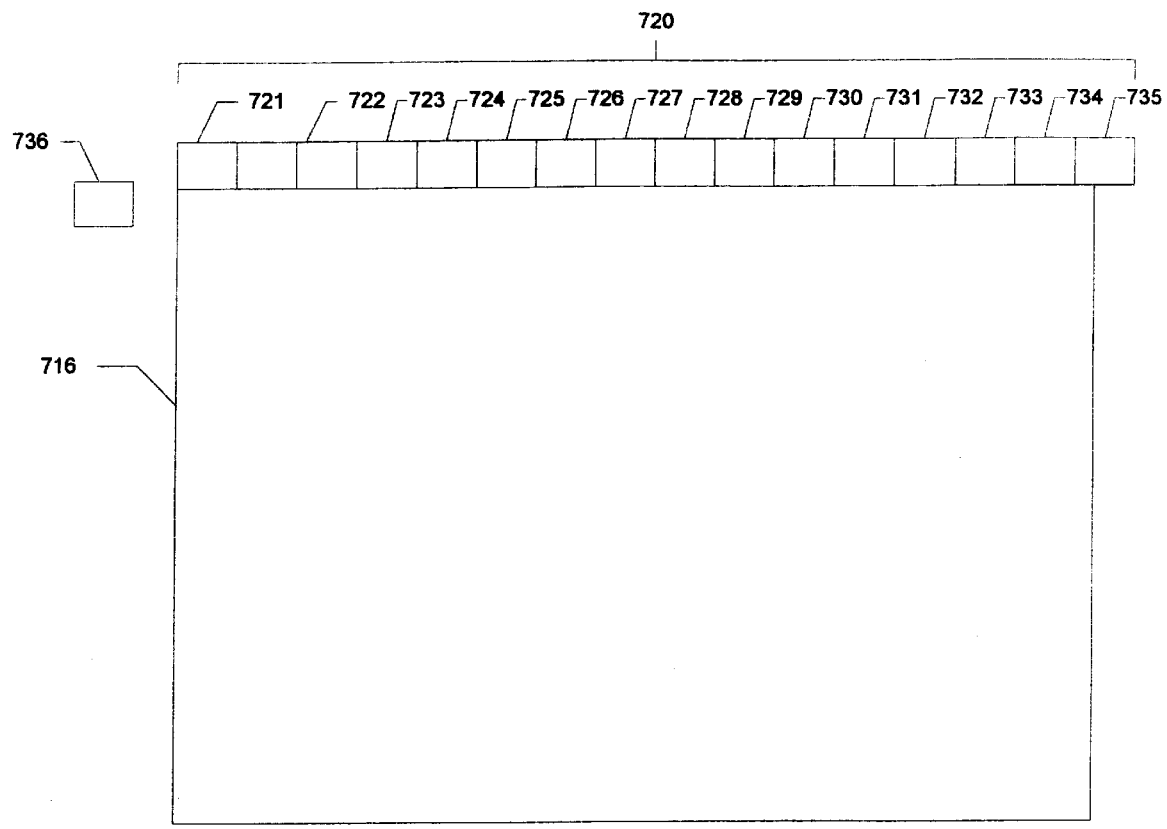
FIG. 12 is a block diagram depicting how data in an input buffer are transferred in accordance with the method and system when ring pixels are provided by the image sensor.

FIG. 12 is a block diagram depicting how an embodiment of the method and system read the area 716 of the input buffers 538 when ring pixels are read in from the CCD array 224 and when the image is a landscape image. The area 716 contains the data from the image area 700 and the ring 712. The data read in the first DMA scan is depicted in area 720. Each subsequent scan is similar to the first scan 720. The first scan 720 and all subsequent scans are 20 lines high. Each CU 721 through 735 of the scan 720 is thirty-two bytes wide. Similarly, each CU in subsequent scans thirty two bytes in width. The CU 736 is the first CU of the second scan. The CU 736 begins not at the twenty first line, but at the seventeenth line. Consequently, there is a four line overlap between each scan.

Because the width the area 712 in FIG. 10 is typically not a multiple of sixteen or thirty two pixels, the data in area 716 of the input buffers 538 will not be a multiple of sixteen or thirty two bytes in length. However, DMA transfers are accomplished through CUs which are sixteen or thirty two bytes in width. As a result, the edges of the area 716 are not on a boundary of a DMA transfer. The DMA transfer for the last CU in each scan is, therefore, modified. Either the data for the missing buffer locations beyond an edge of the area 716 are padded, for example with zeroes, or any data from beyond an edge of the area 716 must be ignored.

Figure 13:
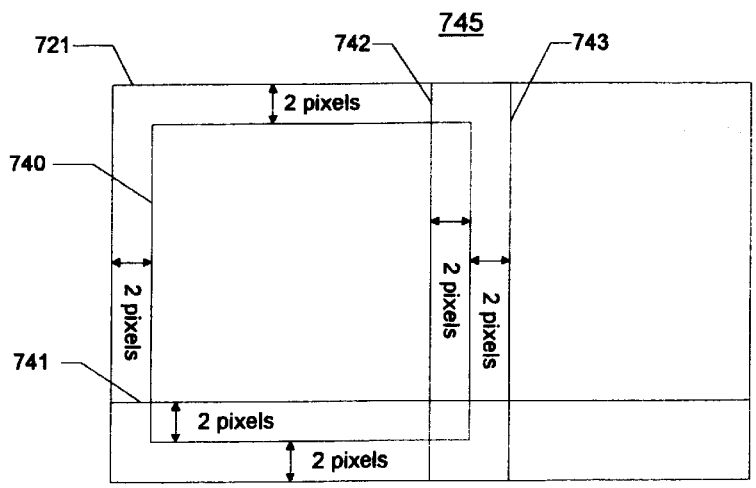
FIG. 13 is a block diagram depicting how data are transferred in accordance with the method and system are divided for interpolation.

Refer now FIG. 13 depicting a more detailed block diagram of a buffer area 745 during processing. The area 745 holds a 32×20 byte block of data for processing. Thus, the area 745 can hold one CU. Data is processed similarly whether ring pixels are provided by software or hardware or whether ring pixels are read in from the CCD array 224. However, if ring pixels are provided by software or hardware, some of the data in the buffer area 745 may be provided by software or hardware rather than by the input buffers 538. For example, for the first scan 750 of FIG. 11, the two rows of data above the area 740 would be provided by software or hardware. For the last scan of FIG. 11, two additional rows of data would be provided by software or hardware. The first two columns of pixels in the first CU of each scan would also be provided by software or hardware. Finally, if ring pixels are provided by software of hardware, the last two columns of pixels in the last CU of each scan would be provided by software or hardware.

A 16×16 byte area 740 is desired for image processing and color conversion. However, the area 740 does not include data for surrounding pixels used for interpolation. To provide all the data for interpolation of the 16×16 byte area 740, the data in the 20×20 byte portion of area 745 up to line 743 is used. The 32×20 byte area 745 ensures that at least a 20×20 byte block is available.

When the first CU is transferred, image processing is performed on the 20×20 byte block of data up to the line 743. To perform interpolation on the 16×16 byte block adjacent to the area 740, data from the line 742 to the end of area 745 and the first four columns of data in the next CU transferred are used. Thus, once the data is no longer needed for interpolation on area 740, the first 16 columns, to line 742, are discarded. The remaining 16 columns of area 745 are shifted to take the place of the first sixteen columns. As the next CU is being transferred, the first sixteen columns of the next CU are provided, creating another 32×20 byte block of data. This new 32×20 byte block of data has sufficient data for color interpolation. When processing of the new 20×20 block is completed, the last sixteen columns of the first CU are discarded, the first sixteen columns of the next CU are shifted, and the last sixteen columns of the CU are provided.

This process is repeated for each of the CUs transferred from the input buffers 538. If the ring pixels are provided from the CCD array 225, then for the last CU of each scan, the empty columns are accounted for. The next scan rereads the four lines of data below the line 741. These lines are reread to include the data from the ring pixels for the 16×16 byte block of data below area 740. As a result, sufficient data for color interpolation, color space conversion, and compression of each CU are provided.

Because each CU of data transferred is thirty two bytes in width, the method and system require less bus bandwidth. This is in contrast to a system which CUs are only 20×20 bytes and in which each CU is processed separately. In such a system, the size of the buffer required for processing would be smaller. However, significantly more data in each CU would be transferred twice. The present invention transfers data in 32×20 byte CUs. A larger buffer is required to process the data. However, the present invention does not need to repeatedly transfer the same data. Instead, only the four last rows of each scan are transferred twice. As a result, the DMA transfer uses significantly less bus bandwidth.

To provide data in the CUs discussed above and depicted in FIGS. 11, 12 and 13, the DMA is modified because conventional DMA will not provide data in the requisite sized CUs. The CU is defined by the base address, the line length, and the burst count. The base address defines where the DMA transfer commences. The line length defines how much data resides in the line. The burst count defines how many lines are transferred in a CU.

Figure 14:
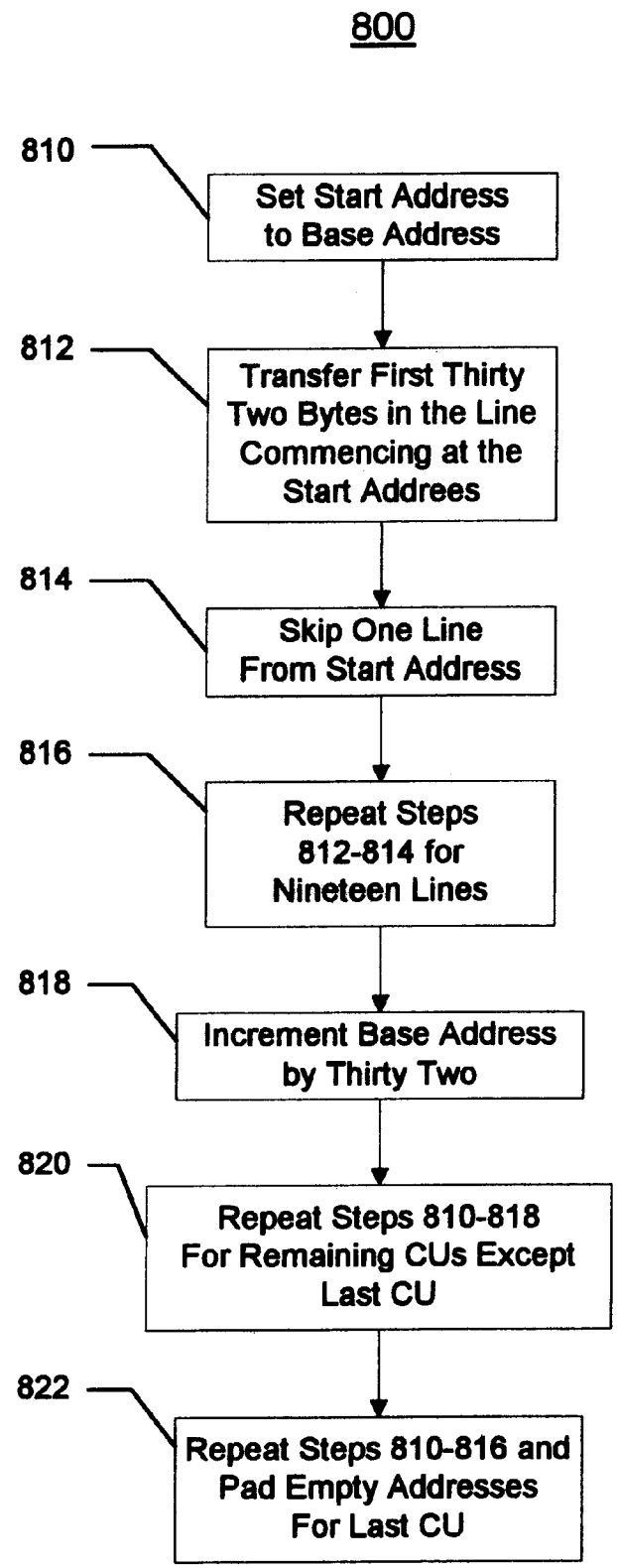
FIG. 14 is flow chart depicting a method for providing a scan in a DMA transfer.
Figure 15A:
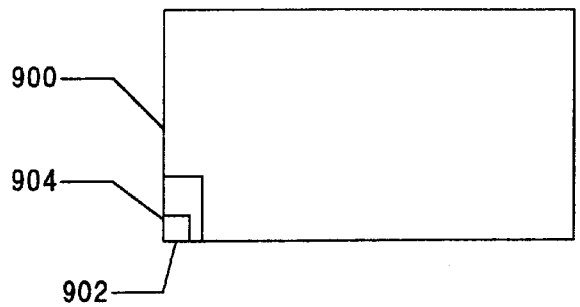
FIG. 15A is a block diagram depicting storage in a buffer for an image taken by rotating the digital camera right.
Figure 15B:
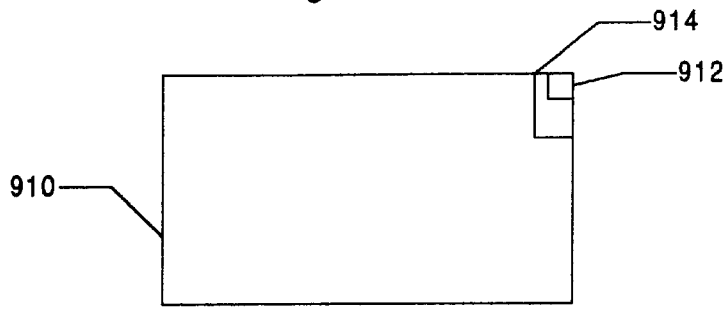
FIG. 15B is a block diagram depicting storage in a buffer for an image taken by rotating the digital camera left.
Figure 15C:
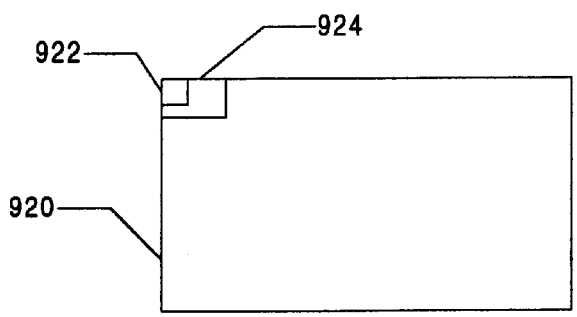
FIG. 15C is a block diagram depicting storage in a buffer for an image taken without rotating the digital camera.
Figure 15D:
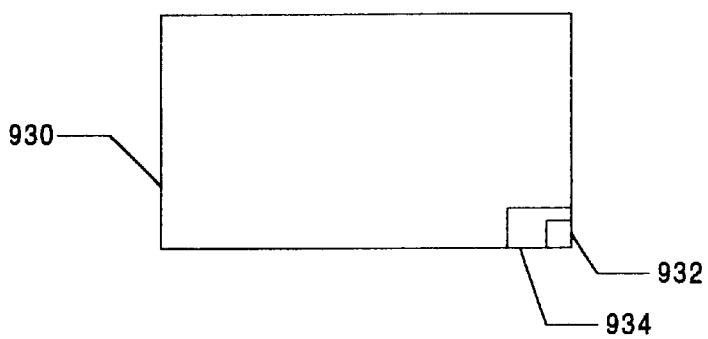
FIG. 15D is a block diagram depicting storage in a buffer for an image taken by inverting the digital camera.

FIG. 14 depicts a method 800 for providing a DMA transfer of the first scan 720 of FIG. 12, where ring pixels are read in from the CCD array 224. The base address is the address of the upper left corner of the area 720. The burst count, the number of lines to be read in on each scan, is twenty. The line length is, for example, 640 pixels. The DMA transfer commences setting the start address to the base address via step 810. The first thirty-two bytes in the line are transferred, beginning at the start address, via step 812. Preferably, this is completed by transferring a burst of eight data words. A line is then skipped via step 814. Steps 812 and 814 are then repeated until the number of lines transferred equals the burst count, via step 816. Consequently, the first 32×20 byte CU 721 of FIG. 12 is transferred.

To move the starting address transferred to the next CU 722, the base address is incremented by 32 bytes via step 818. Steps 810 through 818 are then repeated for all except the last CU 735, via step 820. This transfers the subsequent CUs 722 through 734. Thus, except for the last CU, each subsequent CU in the first scan is transferred in substantially the same manner as the first CU 721. For the last CU, steps 810 through 816 are repeated and the empty buffer locations in the last CU 735 are accounted for, for example by padding the empty addresses, via step 822.

To transfer the second scan, which starts at the CU 736 in FIG. 12, the base address is incremented from the original base address by sixteen lines. Incrementing the original base address by sixteen lines will effectively cause the DMA controller to retransfer the four lines from the first area 720. The bottom four lines of the area 720 are reread to provide all of the pixels required for image processing of the 16×16 byte block of data below area 740, including pixels used only for color interpolation. The method 800 is then repeated to transfer the second scan from the input buffers 538. This process is repeated for the entire area 716. The DMA transfer could be designed so that a software interrupt is provided after each CU is transferred. Similarly, the DMA transfer could also be designed so that a complete scan is transferred before a software interrupt or so that an entire image is transferred without a software interrupt.

Where ring pixels are generated by hardware or software, the method 800 is only slightly altered. Eighteen lines of data are transferred for the first scan 750 of FIG. 11. Thus, the burst count for the first scan is eighteen. The same is true for the last scan. However, each interior scan is twenty lines deep, making the burst count twenty for interior scans. In addition, because the width of area 749 is a multiple of sixteen or thirty two, there are no empty addresses to be accounted for in the last CU of each scan. Otherwise, the method 800 is fully applicable for DMA transfers of data from the input buffers 538 when ring pixels are provided by software or hardware.

The DMA transfer discussed above transfers CUs of data from the input buffers 538, transfers ring pixels or allows ring pixels to be provided by software or hardware, and reduces the necessary bus bandwidth. In order to provide transfers where a captured image can be automatically rotated, further modifications to the DMA 572 are made. These modifications allow an image captured by the camera 110 to be rotated for subsequent viewing by a user.

To provide the data in the correct order for any image, the data for pixels comprising the same portion of the image are transferred in the same order. For example, suppose data for the top left corner of a landscape image is transferred first. The same data for a left or right rotation portrait would be transferred first. The first scan transfers data corresponding to the top of any image. Subsequent scans transfer lower portions of the image, with the last scan transferring the bottom of the image. However, because the camera is rotated during capture of a portrait image, the portion of the CCD array 224 and, therefore, the image buffers 538 corresponding to the top left corner of an image changes. Consequently, the order in which the DMA 572 transfers data from the input buffers 538 is controlled based on the orientation of the image determined by the orientation sensor 560.

FIGS. 15A, 15B, 15C, and 15D illustrate how data is stored in areas 900, 910, 920, and 930 of the input buffers 538 for images taken by rotating the camera right, rotating the camera left, without rotating the camera, and inverting the camera respectively. The upper left corner of each image is designated by memory locations 902, 912, 922, and 932, respectively. Thus, the first CU to be transferred for area 900, 910, 920, and 930 should be CUs 904, 914, 924, and 934, respectively.

Figure 16:
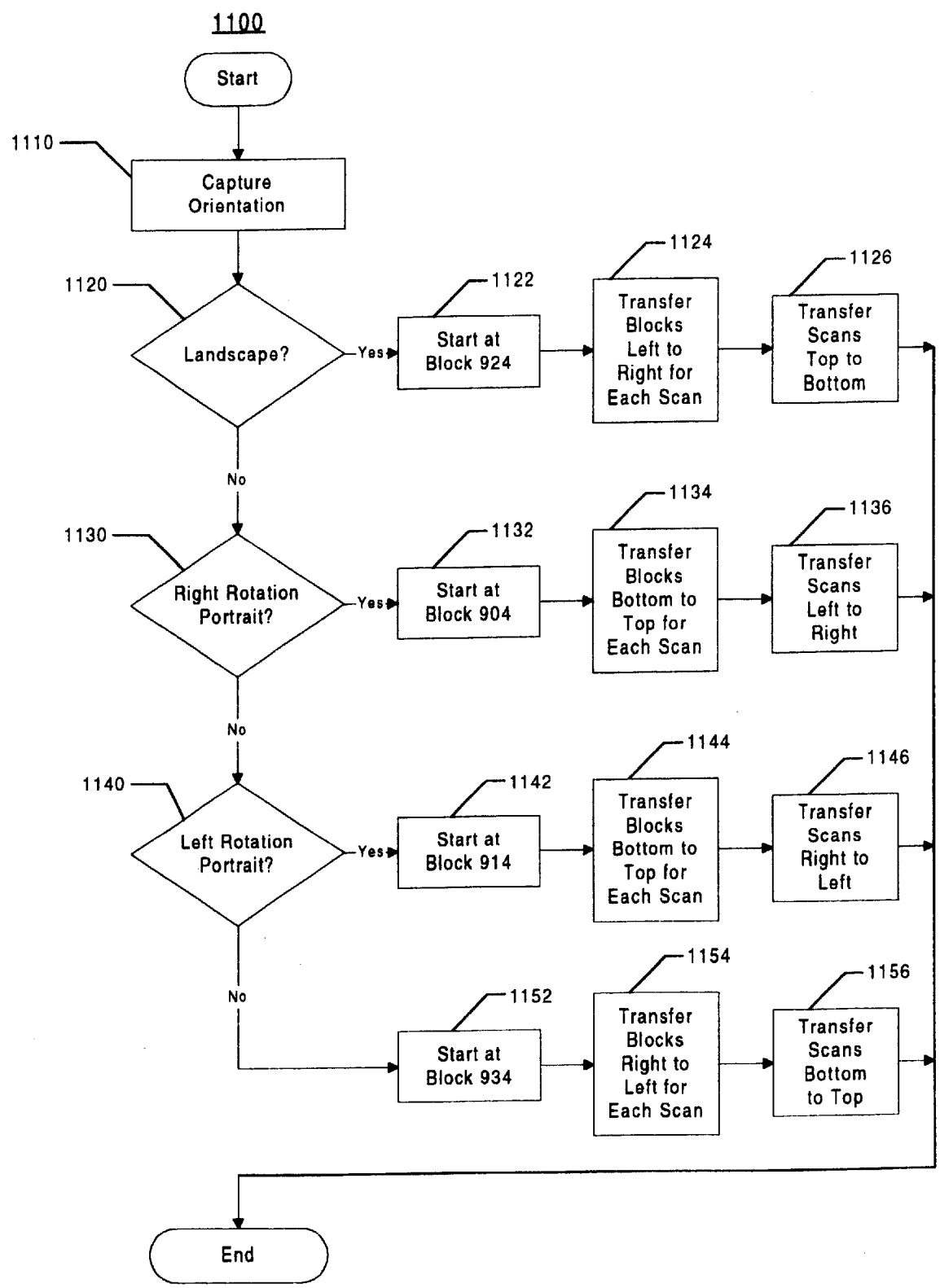
FIG. 16 is a block diagram of a method for transferring data and supporting image rotation.

FIG. 16 depicts a method 1100 for transferring data in CUs and supporting image rotation. The image orientation is captured via step 1110. It is then determined if the image is an upright landscape image via step 1120. If the image is an upright landscape, then DMA is commenced at the CU 924 via step 1122. CUs are then transferred from right to left to form a first scan via step 1124. Scans are transferred starting from the top of the area 920 and proceeding down via step 1126. As for the first scan, each subsequent scan is comprised of CUs transferred from right to left across the area 920. In a preferred embodiment, each scan overlaps a previous scan by four lines. Thus, for a landscape image, the DMA transfer proceeds as discussed with respect to FIGS. 11 and 14.

If the image is not a landscape image, then it is determined if the image is a right rotation portrait image via step 1130. If the image is a right rotation portrait image, then DMA is commenced at the CU 904 via step 1132. CUs are then transferred from bottom to top to form a first scan via step 1134. Scans of CUs are transferred starting from the left of the area 900 and proceeding right via step 1136. As for the first scan, each subsequent scan is composed of CUs transferred from the bottom to the top of the area 900. In a preferred embodiment, each scan overlaps a previous scan by four rows of data. As a result, the entire area 900 will be transferred in the correct order.

If the image is not a right rotation portrait image, then it is determined if the image is a left rotation portrait image via step 1140. If the image is a left rotation portrait image, then DMA is commenced at the CU 914 via step 1142. CUs are then transferred from top to bottom to form a first scan via step 1144. Scans of CUs are transferred starting from the right of the area 910 and proceeding left via step 1146. As for the first scan, subsequent scans are made up of CUs transferred from the top to the bottom of the area 910. In a preferred embodiment, each scan overlaps a previous scan by four columns of data. As a result, the entire area 910 will be transferred in the correct order.

If the image is not a left rotation portrait image, then the image is an inverted landscape image and DMA is commenced at the CU 934 via step 1152. CUs are then transferred from right to left to form a first scan via step 1154. Scans of CUs are transferred starting from the bottom of the area 930 and proceeding up via step 1156. As for the first scan, subsequent scans are made up of CUs transferred from the right to the left of the area 930. In a preferred embodiment, each scan overlaps a previous scan by four rows of data. As a result, the entire area 930 will be transferred in the correct order.

Although the CUs are transferred in a different order depending on the orientation of the image, each CU is transferred in the same manner irrespective of the orientation of the camera 110. Thus, each line is read from left to right and lines are read from the top of a CU to the bottom of the CU.

To transfer CU 924, the method and system transfer the thirty bytes of each of the first twenty lines. Thus, the burst count is twenty. To transfer the first CU 904 of the area 900, the method and system transfer a CU thirty two lines in height and twenty bytes wide. For a right rotation portrait, therefore, a preferred embodiment has a burst count of thirty-two and bursts of five data words per line. Similarly, for the first CU 914 of the area 910, a preferred embodiment of the method and system transfers CUs that are thirty two lines in height and five data words wide.

If the camera 110 does not transfer five data words for each line in a CU, then eight data words per line are transferred for the areas 900 and 910. Transferring eight data words per line ensures that sufficient data for interpolation are provided on each transfer. In such an embodiment the CUs 904 and 914 are each 32×32 byte CUs. Subsequent CUs are also 32×32 bytes.

The DMA transfer has been discussed with respect to providing values defining a basic CU of a DMA transfer and updating these values, such as the start address, each time a CU is transferred. However, nothing prevents controlling the transfer in another fashion. For example, in a preferred embodiment, additional hardware or firmware in a microcontroller connected to the DMA 572 controls the transfer. Thus, software could merely provide information about the image, such as the image orientation, starting address, height, and width, while hardware controls the DMA transfer to provide CUs in the appropriate order for the particular orientation of the image. Thus, a range of methods of controlling the DMA transfer can be achieved.

In order to support automatic rotation of captured images, an additional modification to transfers by DMA 572 is made. As discussed above, the method and system transfer CUs of data in the same order with respect to the image. However, within each CU, data is always transferred in the same manner. For example, data is read sequentially from left to right across a line, and lines are transferred starting at the top of a CU and ending at the bottom of the CU. Consequently, the data for a memory location is no longer in the proper position within a CU. To compensate for this, the method and system also allow the DMA transfer to shuffle the locations for each CU. This is referred to as a "pixel shuffle."

Figure 17A:
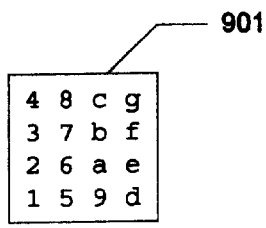
FIG. 17A is a block diagram of a 4×4 computational unit when the digital camera is upright.
Figure 17B:
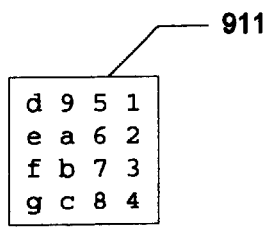
FIG. 17B is a block diagram of the data in one computational unit of the input buffer when the digital camera is rotated right.
Figure 17C:
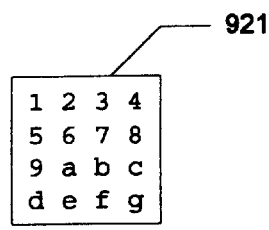
FIG. 17C is a block diagram of the data in one computational unit of the input buffer when the digital camera is rotated left.
Figure 17D:
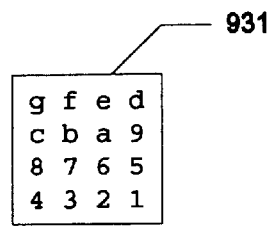
FIG. 17D is a block diagram of the data in one computational unit of the input buffer when the digital camera is inverted.

FIGS. 17A–17D depict 4×4 CUs of data 901, 911, 921, and 931, respectively, in the input buffers 538 for four camera orientations. In each figure, the locations 1–4 represent data from the pixels capturing upper part of the image. FIG. 17A depicts the data in memory locations of the CU 901 of data in the input buffers 538 when the image is a right rotation portrait. FIG. 17B depicts the locations for the CU 911 of data in the input buffers 538 when the image is a left rotation portrait image. FIG. 17C depicts the CU 921 of data from the input buffers 538 when the camera is not rotated. FIG. 17D depicts the CU 921 of data from the input buffers 538 when the camera is inverted. In each CU 901, 911, 921, and 931 data should be transferred in the order 1–9 then a–g.

In each case, a DMA transfer proceeds from right to left across a line and from top to bottom in a CU. Referring now to FIG. 17C, the DMA transfers the data in the CU 921 in the correct order. Thus, locations 1–9 then a–g will be transferred. However, for the right rotation portrait image, left rotation portrait image, and inverted landscape image cases depicted in FIGS. 17A, 17B, and 17D, respectively, a sequential line by line transfer of the CUs 901, 911, and 931 will result in the data being in an incorrect order for processing.

To correct the order of the data provided from the input buffers 538 for left and right rotation portrait images, the data in each CU is shuffled, or written into the appropriate memory locations. Thus, the pixel shuffle can be performed either by hardware or by software. In one embodiment, data from the input buffers 538 is DMA transferred to an intermediate buffer (not shown). The pixel shuffle is performed between the input buffers 538 and the intermediate buffer. In another embodiment, when the DMA 572 transfers the data from the input buffers 538, the DMA 572 also provides the pixel shuffle, eliminating the need for the intermediate buffer.

As a result, the data for areas 900, 910, and 930 will be in the appropriate memory locations after transfer. Thus, when the transfer is complete, the data for each CU 900, 910, and 930 will appear as though the data were transferred in the order 1–9 then a–g. In one embodiment, data for ring pixels are inserted in software or hardware after shuffling has completed, which reduces the amount of data for which shuffling must be performed.

To account for image rotation, a change to the DMA transfer from the CCD array 224 is also made. This change, which modifies the pixels transferred from the CCD array 224, is referred to as a "pixel offset."

FIGS. 18A–D depict an embodiment of the pixel offset for landscape, right rotation portrait, left rotation portrait, and inverted landscape images, respectively, in accordance with the method and system. The area 928 indicates the image area of the CCD array 224 when the camera is in an upright orientation. Because the upper left pixel of the area 928 is a green pixel in a line of green and red pixels, the hardware and software of the camera 110 expect the first line of an image to start with a green pixel and be composed of green and red pixels.

If the camera 110 is rotated right, the top line of the image area 928 would be a line of blue and green pixels. To ensure that the hardware and software receive the green and red pixels expected, the image area is offset to the area 908, displayed in FIG. 18B. Similarly, if the camera 110 is rotated left, the top line of the area 928 would be a line of red and green pixels. However the top line of pixels would commence with a red pixel. To ensure that the hardware and software receive the green and red pixels expected, the image area is offset to the area 918 of FIG. 18C. Finally, if the camera 110 is inverted, the top line of the area 928 would be a line of blue and green pixels. To ensure that the hardware and software receive the green and red pixels expected, the image area is offset to the area 938 of FIG. 18D.

Because the image area is offset when the camera 110 is rotated right or left, the appropriate pattern of pixels is provided to the input buffers 538 and other components of the camera 110. As a result, where the pixels are offset and shuffled, the correct pattern of data is provided to the input buffers 538.

Note that in a preferred embodiment, the pixel offset is provided by changing the pixels provided from the CCD array 224 because restrictions in DMA make the pixel offset more difficult to perform strictly in DMA. The mechanism for determining which pixels are transferred from the CCD array 224 can be easily be modified to shift the starting point for pixels transferred from the CCD array 224 by the requisite number of pixels, usually a single row or column of pixels. This relatively simple offset allows the correct pattern of pixels to be provided to the hardware and software.

Thus, in accordance with the method and system, a programmable DMA transfers data in the correct sized CUs and in the appropriate order regardless of the orientation of the camera 110. The DMA transfer can also transfer ring pixels from the CCD array 224. Ring pixels can also be added by software or hardware. In addition, the pixels may be shuffled and offset by the DMA transfer to ensure that the data is provided in the correct order for processing by the camera 110. As a result, an image can be rotated, for example to be in an upright orientation regardless of whether the image is a portrait image or a landscape image.

A method and system have been disclosed for providing a data transfers which support image rotation. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for transferring data from an image sensor and supporting rotation of an image in an image capture device, the image sensor having a particular configuration of elements, wherein the image sensor has a left edge, and a top; wherein the particular configuration of elements further includes a plurality of light sensors arranged in an array, the array having a plurality of rows and a plurality of columns, each row and each column further including a portion of the plurality of light sensors, the method comprising the steps of:

(a) determining the orientation of the image capture device; and (b) defining an image area of the image sensor based on the orientation of the image capture device to ensure that a particular portion of the particular configuration of elements occurs at a corresponding portion of the image irrespective of the orientation of the image capture device, wherein image area defining step (b) further comprises the step of (b1) defining a first image area if the image capture device is in a landscape orientation;

(b2) defining a second image area offset from the first image area by one column toward the left edge if the image capture device is in a right rotation portrait orientation; and (b3) defining a third image area offset from the first image area by one column up if the image capture device is in a left rotation portrait orientation.

2. The method of claim 1 wherein orientation determining step further includes the step of:

(a1) determining if the image capture device is in a landscape orientation, a right rotation orientation, or a left rotation orientation.

3. The method of claim 1 wherein the image area defining step (b) further includes the step of:

(b1) shifting the image area of the image sensor to ensure that the particular portion of the particular configuration of elements occurs at the corresponding portion of the image.

4. The method of claim 1 wherein each element further comprises a pixel.

5. The method of claim 4 wherein the array further comprises a Bayer array.

6. A system for transferring data from an image sensor and supporting rotation of an image in an image capture device, the image sensor having a particular configuration of elements, wherein the image sensor has a left, and a top; wherein the image sensor further includes an array, the array having a plurality of rows and a plurality of columns, each row and each column further including a plurality of light sensors, the system comprising:

means for determining the orientation of the image capture device; and means for defining an image area of the image sensor based on the orientation of the image capture device to ensure that a particular portion of the particular configuration of elements occurs at a corresponding portion of the image irrespective of the orientation of the image capture device, wherein image area defining means further comprise:

means for defining a first image area if the image capture device is in the landscape orientation, for defining a second image area if the image capture device is in the right rotation portrait orientation, and for defining a third active are if the image capture device is in the left rotation portrait orientation, the second image area being offset from the first image area by one column to the left; and the third image area being offset from the first image area by one column up.

7. The system of claim 6 wherein orientation determining step means further comprise:

means for determining if the image capture device is in a landscape orientation, a right rotation orientation, or a left rotation orientation.

8. The system of claim 6 wherein the image area defining means further includes:

means for shifting the image area of the image sensor to ensure that the particular portion of the particular configuration of elements occurs at the corresponding portion of the image.

9. The system of claim 6 wherein each light sensor further comprises a pixel.

10. The system of claim 9 wherein the array further comprises a Bayer array.

11. The system of claim 10 wherein the image capture device is a digital camera.

* * * * *